Nov. 16, 1926. 1,607,108

A. G. WHITEHEAD

BELT COUPLING

Filed July 10, 1926

A.G. Whitehead
INVENTOR

BY Victor J. Evans
ATTORNEY

Patented Nov. 16, 1926.

1,607,108

UNITED STATES PATENT OFFICE.

ARTHER G. WHITEHEAD, OF FORT WORTH, TEXAS.

BELT COUPLING.

Application filed July 10, 1926. Serial No. 121,608.

This invention relates to a belt coupler, the general object of the invention being to hingedly connect two end parts of a belt together in such a manner that the portions of the hinges can be separated when they have been moved at right angles to each other so that the ends of the belt can be separated.

Another object of the invention is to so form the hinge parts that a casing is formed to hold lubricant so that the joint or coupling can be lubricated.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 5:
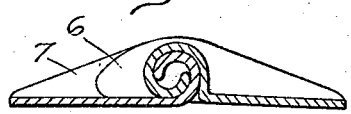
Figure 5 is a transverse sectional view through Figure 2.

In these views, 1 indicates a hinge section which is riveted or otherwise fastened to the belt section 2, and 3 indicates the other hinge part which is fastened to the section 4. The outer edge of each part is rolled to produce a spiral, as shown at 5 in Figure 5. One spiral is fitted endwise in the other so that the two parts are hingedly connected together.

Figure 1:
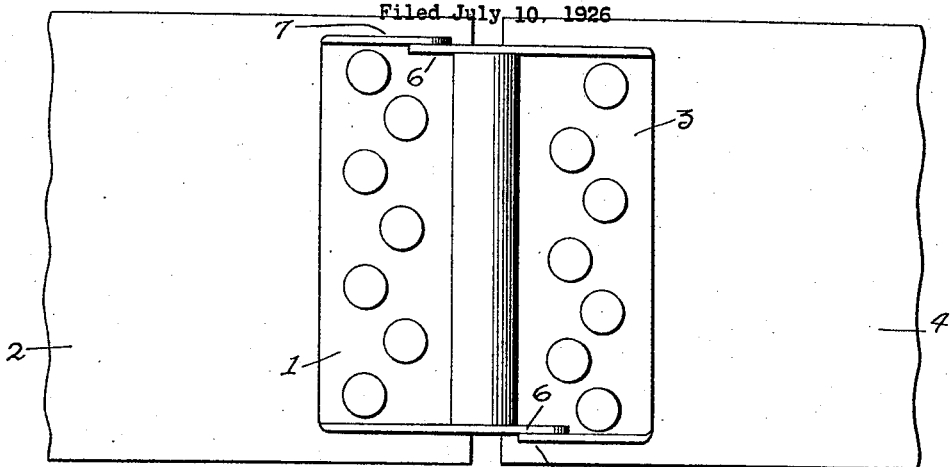
Figure 1 is a plan view of two end parts of the belt showing the improved connecting means.
Figure 2:
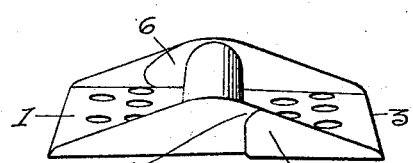
Figure 2 is a perspective view of the connecting means.
Figure 4:
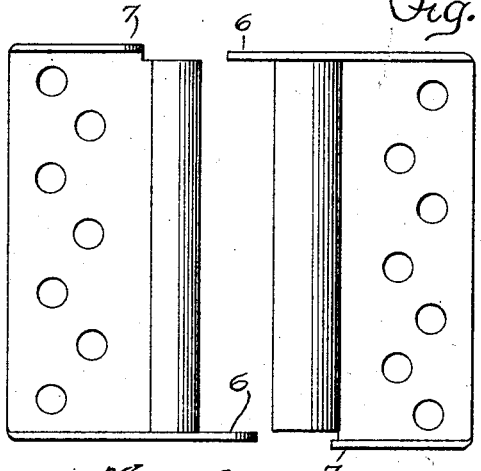
Figure 4 is a view showing the two parts separated.
Figure 3:
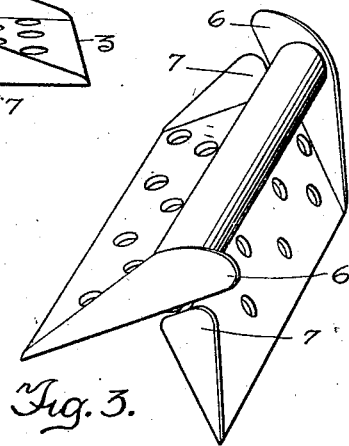
Figure 3 is a similar view but showing the parts turned at rightangles to each other so that they can be separated.

A long flange 6 is formed at one end of each hinge part, the flanges being oppositely arranged and each flange closes one end of the space formed by the spiral of its hinge part. A short flange 7 is formed on each hinge part and the extended ends of the flanges 6 are adapted to engage the inner faces of the flanges 7 when the hinge parts are in open position so that end movement of the parts is prevented. However, if the hinge parts are moved at rightangles to each other, as shown in Figure 3, the flanges will disengage each other so that one hinge part can be moved endwise of the other part so that the parts can be separated. The spirals form a casing or chamber for receiving lubricant and the invention forms a simple device for connecting the ends of the belt together, the parts being easily detachable so that the ends of the belt can be separated by simply moving one part at rightangles to the other and then moving the parts endwise to remove one spiral from the other.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A belt coupling comprising a pair of plates adapted to be fastened to the ends of a belt, each plate having its outer edge rolled, with the roll of one plate fitting in the roll of the other plate so that the plates are rotatably connected together and means at the ends of the plates for preventing end movement of one plate in relation to the other when the plates are in alignment, but permitting such end movement for separation of the plates when one plate has been moved at an angle to the other plate.

2. A belt coupling comprising a pair of plates, the outer edge of each plate being rolled, with the roll of one plate fitting in the roll of the other plate, a flange on each plate covering the outer end of the roll on said plate and said flanges and rolls forming a lubricant receiving chamber.

3. A belt coupler comprising a pair of plates adapted to be fastened to the ends of a belt, each plate having its outer edge rolled, with the roll of one plate fitting in the roll of the other plate so that the plates are hingedly connected together, a flange on each end of each plate, one flange on each plate having an extension which covers the end of the roll and engages a flange on the other plate for preventing endwise movement of the plates unless the plates are moved at right angles to each other.

In testimony whereof, I affix my signature.

ARTHER G. WHITEHEAD.